United States Patent [19]

Yano et al.

[11] 4,152,168

[45] May 1, 1979

[54] PROCESS FOR PREPARING CEMENT PRODUCT

[75] Inventors: Naomichi Yano; Kuniaki Sato, both of Osaka, Japan

[73] Assignee: Kubota Ltd., Osaka, Japan

[21] Appl. No.: 848,315

[22] Filed: Nov. 3, 1977

[30] Foreign Application Priority Data

Nov. 5, 1976 [JP] Japan .................................. 51/13333
Nov. 9, 1976 [JP] Japan .................................. 51/13483
Feb. 7, 1977 [JP] Japan .................................. 52/12773

[51] Int. Cl.$^2$ .............................................. C04B 7/02
[52] U.S. Cl. ...................................... 106/99; 106/120
[58] Field of Search ................... 106/90, 99, 120; 427/186, 203, 377, 385

[56] References Cited

U.S. PATENT DOCUMENTS

| 3,219,467 | 11/1965 | Redican et al. | 106/99 |
| 3,870,553 | 3/1975 | Hussey | 106/90 |
| 4,043,826 | 8/1977 | Hum | 106/90 |

*Primary Examiner*—James Poer
*Attorney, Agent, or Firm*—Armstrong, Nikaido, Marmelstein & Kubovcik

[57] ABSTRACT

A process comprising the steps of adding an inorganic foamed aggregate, an inorganic solid aggregate and a reinforcing fiber to cement to prepare a cement mixture, kneading the cement mixture with addition of 3 to 15% by weight of water based on the mixture to obtain a relatively hard kneaded mixture, press-molding the kneaded mixture at pressure of 200 to 600 kg/cm$^2$, adding water to the molded piece to adjust the water content thereof, preheating the molded piece at a temperature of 40° to 70° C. before curing, spraying to the surface of the heated molded piece an aqueous dispersion prepared from resin and cement-type coloring material and containing inorganic particles 0.1 to 1.5 mm in size, drying the coated piece, applying a colored resin composition to the coating, and curing the resulting piece in an autoclave with pressurized steam, whereby a colored roofing panel or like cement product can be prepared.

9 Claims, No Drawings

PROCESS FOR PREPARING CEMENT PRODUCT

BACKGROUND OF THE INVENTION

Roofing cement panels are usually made from a mixture of cement and sand in proportions by weight of 1:3 by preparing the mixture in the form of a hard-kneaded mortar, forcing the mortar into molds on a molding machine, scraping off excess mortar to mold the mortar in the desired shape, and transferring the molds from the machine to the curing chamber with the molded pieces contained in the molds. However, the roofing cement panels thus obtained are not fully satisfactory in bending strength, heat-insulating properties and freeze-thaw resistance, have relatively great weight and involve the drawback that cracks are liable to develop during curing.

SUMMARY OF THE INVENTION

This invention provides a process for making roofing cement panels and like cement products which are outstanding in mechanical strength, heat-insulating properties and freeze-thaw resistance and which can be prepared free of cracking during curing.

Another object of this invention is to provide a process for preparing cement products in which an aqueous colored cement composition containing inorganic particles is applicable to the surface of uncured cement product with the particles adhered to the surface as uniformly distributed thereover free of irregularities which would otherwise result from sagging of the composition so as to obtain a cement product having a glossless attractive facing over the entire surface.

DETAILED DESCRIPTION OF THE INVENTION

The cement product of this invention is prepared from a mixture of an inorganic foamed aggregate such as pumice or foamed siliceous sand, an inorganic solid aggregate such as sand or siliceous sand, a reinforcing fibrous material such as asbestos, glass fiber, rock wool, steel fiber, vinylon fiber or carbon fiber, cement, and a filler such as solid cement waste. Water is added to the cement mixture in an amount of 3 to 15% by weight, preferably 5 to 12% by weight, based on the mixture, and the resulting mixture is kneaded in a mixer to obtain a relatively hard kneaded mixture.

The kneaded mixture is then press-charged into a mold and molded to the shape of a roofing panel at pressure of 200 to 600 kg/cm$^2$.

Subsequently the molded piece is immersed in water, or water is applied to the piece to adjust the water content. The molded piece is thereafter allowed to stand for 1 to 2 days for spontaneous curing, namely for primary curing, whereby the molded piece is semi-hardened. A coloring powdery material prepared by mixing cement with a coloring pigment is then applied to the surface of the semi-hardened piece. The piece is then subjected to secondary curing in an autoclave with saturated steam at 5 to 8 atm for about 10 hours. A resin coating composition is applicable to the semi-hardened piece as the coloring material, in which case the coating layer is heated at a temperature of 60 to 70° C. for several minutes to form a coloring layer.

According to the process described above, the amount of water used for preparing the kneaded mixture is limited to 3 to 15% by weight based on the cement mixture, so that the cement has the lowest possible flowability and is prevented from penetrating into the porous interior of of the inorganic foamed aggregate. Moreover with the use of the relatively low molding pressure of about 200 to 600 kg/cm$^2$, the surface of the inorganic foamed aggregate remains porous, free of clogging with the cement. At a molding pressure higher than 600 kg/cm$^2$, the cement will be forced into the porous structure of the inorganic foamed aggregate, whereas at pressure lower than 200 kg/cm$^2$, the resulting molding will have poor strength owing to insufficient compression, failing to fully retain its shape.

We conducted the following experiment according to this invention. The parts herein used are all by weight.

Experiment

To a mixture of 9 parts of asbestos, 25 parts of siliceous sand, 33 parts of cement, 19 parts of natural pumice and 15 parts of solid cement waste was added 8% by weight of water based on the mixture, and the resulting mixture was kneaded in a mixer. The kneaded mixture was press-molded at pressure of 400 kg/cm$^2$ to a 12-mm thick planar panel. The molded panel was then immersed in water and thereafter spontaneously cured for 1 day and finally cured in an autoclave.

The roofing panel thus prepared was tested for specific gravity, bending strength, freeze-thaw resistance and thermal conductivity in comparison with an asbestos cement roofing panel made by the dry method and having a cement to asbestos ratio of 85:15. The results are given below which show that the roofing panel made according to this invention is superior to the asbestos cement panel in every property.

| Property | Panel of the Invention | Asbestos cement panel |
| --- | --- | --- |
| Specific gravity | 1.5 | 2.2 |
| Bending strength | 120 kg/cm$^2$ | 85 kg/cm$^2$ |
| Thermal conductivity | 0.3 Kcal/mh° C. | 0.5 Kcal/mh° C. |

It is required that roofing cement panels be provided with a glossless facing of subdued color. We attempted to form such a colored facing on an uncured unhardened press-molded cement panel in which an inorganic foamed aggregate retains its original porous state, by spraying to the panel an aqueous colored cement composition containing inorganic particles 0.5 to 1.5 mm in size and drying the coating to form a glossless surface due to the presence of the particles. This process gave a satisfactory product having a substantially inseparable colored facing, with the surface of the uncured cement molding impregnated with the colored cement composition.

However, when a three-dimensional article such as a ridge slate is faced by this process, the aqueous colored cement composition will flow down the vertical surface of the molding before the composition dries, permitting the inorganic particles in the composition to move or be displaced under gravity and consequently failing to cause the particles to produce a satisfactory glossless surface.

In order to overcome this problem, the uncured molded piece is preheated at a temperature of 40 to 70° C., and a colored emulsion or a colored liquid composition in the foam of a mixture of resin and cement containing inorganic particles is sprayed against the heated surface of the molded piece. Because the solvent, such as water, contained in the resin emulsion or composition quickly evaporates off, increasing the viscosity of the composition, the gravitational displacement of the deposited particles no longer takes place but the particles adhere to the surface of the molding as uniformly distributed thereover.

The resulting molded piece is spontaneously cured for 1 day, permitting the cement to undergo a mild hydration reaction, and thereafter placed into an autoclave, in which the molded piece is heated with saturated steam at pressure of 5 to 8 atm for about 10 hours. During the curing, the resin contained in the composition and impregnating the porous structure of the cement molded piece is fused to the porous structure, giving an excellent substantially inseparable facing on the molded piece of cement.

The uncured cement molding is preheated preferably at a temperature of 40° to 70° C. At temperatures lower than 40° C., the water in the resin composition will not effectively evaporate off, whereas at temperatures higher than 70° C., the cement in the molding will rapidly undergo hydration reaction producing internal stress, with the result that cracks are likely to develop in the molding.

The colored resin emulsion to which inorganic particles are added to prepared for example by dissolving acrylic-urethane resin in a solvent and adding a pigment to the solution. The colored liquid composition of resin and cement admixed therewith and further containing inorganic particles is obtained by preparing the colored cement composition set forth below, admixing an amount of the cement composition with the same amount of colored siliceous sand to be used as inorganic particles and having the same color as the cement composition, and admixing an emulsion of water-dispersible resin with the resulting mixture in two to three times the amount of the latter. The emulsion of water-dispersible resin is prepared for example by adding 65 parts of water to 100 parts of acrylic resin.

| Colored cement composition | | |
|---|---|---|
| Silica flour | 7 | parts |
| Titanium oxide | 12 | " |
| Cement | 9 | " |
| Siliceous sand | 3 | " |
| Asbestos | 2 | " |
| Pigment | 67 | " |

With the embodiment described above, cement powder is added to the emulsion of water-dispersible resin, so that resulting coating and the molded cement substrate have substantially the same coefficient of thermal expansion. Accordingly even if thermal deformation takes place, no thermal stress occurs between the two, and the separation of the coating can be avoided.

According to another embodiment of this invention, the uncured cement molded piece is preheated at 40 to 70° C. and then coated with a colored liquid resin composition prepared by admixing a colored cement composition with inorganic particles and further adding an emulsion of water-dispersible resin to the resulting mixture in the same manner as in the above embodiment. The resulting coating is dried. A colored resin composition such as a colored emulsion of acrylic resin is further sprayed to the coated molded piece, and the resulting piece is cured in an autoclave with saturated steam at 5 to 8 atm. Since the colored emulsion is applied to the piece after the coating of the colored liquid resin composition of resin-cement mixture has been dried, there will be no mixture of the colors due to the mixture of the compositions. Additionally, the coating of the colored emulsion is rendered rough due to the presence of the particles uniformly adhered to the surface of the molded piece, with the result that the emulsion coating provides a facing of reduced gloss. Because the colored emulsion coating has an extremely small thickness, the color of the undercoat of the colored resin-cement mixture appears on the surface, thus producing a modulated color tone. The outermost resin coating is baked during curing in the autoclave and thereby made highly resistant to water.

According to still another embodiment of this invention, the uncured cement molded piece is preheated at 40° to 70° C. and then coated with a colored liquid resin composition prepared by admixing a colored cement composition with inorganic particles and further adding an emulsion of water-dispersible resin with the resulting mixture in the same manner as in the above embodiment. The resulting coat is dried. A colored inorganic coating composition such as one containing colloidal silica is then sprayed to the coated molded piece, and the resulting piece is cured with saturated steam at 5 to 8 atm for about 10 hours. The molded cement piece thus treated is then cooled and thereafter preheated at a suitable temperature. A transparent resin coating composition, as of the two-liquid solvent type, particularly a urethane type coating composition is then applied to the piece to obtain a finished product. The coating of the colored inorganic coating composition is rendered rough owing to the presence of the inorganic particles uniformly adhered to the substrate and therefore provides a facing of reduced gloss. Since the molded piece is coated with an organic material, it is less susceptible to discoloration.

The roofing cement panels prepared by the present invention incorporates an inorganic foamed aggregates. According, even if the water contained therein should expand on freezing, the resulting increment in volume will be accommodated in the pores of the foamed aggregate, whereby occurrence of stress can be inhibited and cracking can be prevented. The panels therefore have high freeze-thaw resistance.

We claim:

1. A process for preparing a cement product by adding water to a mixture of cement, an inorganic solid aggregate and a reinforcing fiber comprising the steps of:

adding an inorganic foamed aggregate, an inorganic solid aggregate and a reinforcing fiber to cement to prepare a cement mixture, kneading the cement mixture with addition of 3 to 15% by weight of water based on the mixture to obtain a relatively hard kneaded mixture, press-molding the kneaded mixture in a mold at pressure of 200 to 600 kg/cm$^2$, adding water to the molded piece to adjust the water content of the molded piece, spontaneously curing the molded piece to obtain a semi-hardened piece, applying a colored liquid resin composition containing inorganic particles to the surface of the semi-hardened molded piece, and curing the resulting molded piece with pressurized steam.

2. A process as defined in claim 1 wherein the cement product is a roofing panel.

3. A process for preparing a cement product by adding water to a mixture of cement, an inorganic solid aggregate and a reinforcing fiber comprising the steps of:
- adding an inorganic foamed aggregate, an inorganic solid aggregate and a reinforcing fiber to cement to prepare a cement mixture,
- kneading the cement mixture with addition of 3 to 15% by weight of water based on the mixture to obtain a relatively hard kneaded mixture,
- press-molding the kneaded mixture in a mold at pressure of 200 to 600 kg/cm$^2$,
- adding water to the molded piece to adjust the water content of the molded piece,
- preheating the molded piece at a temperature of 40 to 70° C. before curing,
- applying a colored liquid resin composition containing inorganic particles to the surface of the preheated uncured molded piece, and
- curing the resulting molded piece with pressurized steam.

4. A process as defined in claim 3 wherein the colored liquid resin composition containing inorganic particles is prepared by adding an emulsion of water-dispersible resin to a mixture of a colored cement composition and the inorganic particles.

5. A process as defined in claim 3 wherein the colored liquid resin composition containing inorganic particles is prepared by adding the inorganic particles to a colored emulsion of water-dispersible resin.

6. A process as defined in claim 3 wherein the step of applying a colored liquid resin composition is carried out by spraying to the surface of the molded piece a resin composition prepared by adding an emulsion of water-dispersible resin to a mixture of a pigment and the inorganic particles, thereafter drying the coated molded piece, and subsequently applying a colored resin composition to the resulting piece.

7. A process as defined in claim 3 wherein the step of applying a colored liquid resin composition is carried out by spraying to the surface of the molded piece a resin composition prepared by adding an emulsion of water-dispersible resin to a mixture of a pigment and the inorganic particles, thereafter drying the coated molded piece, and subsequently applying a colored inorganic coating composition to the resulting piece.

8. A process as defined in claim 7 wherein the molded piece resulting from the curing step is cooled and then heated again, and a transparent resin coating composition is applied to the heated piece.

9. A process as defined in claim 6 wherein the cement product is a roofing panel.

* * * * *